United States Patent Office 3,116,299
Patented Dec. 31, 1963

3,116,299
PREPARATION OF SUBSTITUTED DIOXEPINS
George B. Sterling, Midland, Mich., Edward J. Watson, Norwich, N.Y., and Chester E. Pawloski, Bay City, Mich., assignors to The Dow Chemical Company, Midland, Mich., a corporation of Delaware
No Drawing. Filed Jan. 3, 1961, Ser. No. 80,021
6 Claims. (Cl. 260—338)

The present invention relates to the preparation of substituted dioxepins and is more particularly concerned with the preparation of 1,3-dioxepins by the single exchange reaction between 2-butene-1,4-diol and a dialkoxy compound such as an acetal or a ketal.

We have found that substituted 1,3-dioxepins may be conveniently prepared in high yield and purity by reacting 2-butene-1,4-diol with an appropriate dialkoxy compound, e.g. an acetal or a ketal, in the presence of an acid catalyst and at a temperature of from about 20° to about 100° C., preferably at room temperature or slightly above.

The reaction is illustrated as follows:

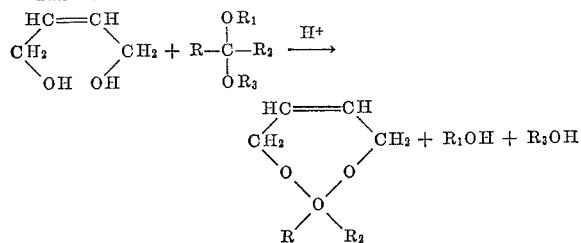

wherein R and R$_2$ represent individual members of the group consisting of alkyl and halosubstituted alkyl groups containing up to 9 carbon atoms, aryl and haloaryl groups of the benzene series, alkenyl groups containing from 2 to 9 carbon atoms, hydrogen, and cyclizing linear polymethylene units containing 2 to 3 carbon atoms; and R$_1$ and R$_3$ represent alkyl groups containing up to 9 carbon atoms.

Suitable acetals and ketals include, for example, 2,2-dimethoxypropane; 2,2-dimethoxybutane; 3,3-dimethoxypentane; 2,2-dibutoxy propane; 2-butoxy-2-methoxy propane; 2,2-dimethoxy-3-bromo-propane; 1,1-diethoxyethane, dimethoxy cyclohexane; α,α-dimethoxy toluene and the like.

Approximately equimolar proportions of the butenediol and the acetal or ketal may be employed although for best results approximately twice as much ketal or acetal, molar basis, should be used.

Any non-oxidizing acidic catalyst may be employed, such as, for example, sulfuric acid, dichloroacetic acid, phosphoric acid, trichloroacetic acid, dichloropropionic acid and the like.

The following examples further illustrate the present invention but are not to be construed as limiting.

EXAMPLE 1

Five moles (440 grams) of 1,4-butenediol and 5.25 moles (546 grams) of 2,2-dimethoxypropane, and a few drops of concentrated sulfuric acid were placed in a 2-liter flask. An endothermic reaction resulted in the formation of a single liquid phase in the flask. The mixture was then distilled at atmospheric pressure (2/1 ratio) until the head temperature reached 62° C., after which distillation was continued under vacuum. A 63% yield of 4,7-dihydro-2,2-dimethyl-1,3-dioxepin was obtained boiling at 41° C. at 6.0 mm. of mercury pressure absolute.

EXAMPLE 2

The above experiment was repeated using 1040 grams (10 moles) of 2,2-dimethoxypropane. The yield of product was 74%.

EXAMPLE 3

In a manner similar to that of Examples 1 and 2, the acetals and ketals listed in the following table were reacted with 2-butene-1,4-diol. The product, yield, and product boiling point are given in the table.

*Table 1*

| Run | Acetal or Ketal | 1,3-Dioxepin | Percent Yield | B.P., °C. |
|---|---|---|---|---|
| 1 | Dimethoxymethane | 4,7-dihydro- | 4 | 124° C.—760 mm. |
| 2 | Dimethoxybutane | 2-ethyl-2-methyl-4,7-dihydro- | 38 | 101° C.—89 mm. |
| 3 | Diethoxypropane | 2,2-dimethyl-4,7-dihydro- | 46 | 41° C.—6 mm. |
| 4 | Dibutoxypropane | do | 50 | 41° C.—6 mm. |
| 5 | 2-butoxy-2-methoxy propane | do | 53 | 41° C.—6 mm. |
| 6 | 2,2-dimethoxy-1-bromopropane | 2-bromomethy-2-methyl-4,7-dihydro-. | 68.5 | 116° C.—10 mm. |
| 7 | 1,1-diethoxyethane | 2-methyl-4,7-dihydro | 53 | 137–138° C.—760 mm. |
| 8 | 1,1-dimethoxy-cyclohexane | 7,12-dioxospiro-[5.6] dodec-9-ene- | 88 | 54° C.—0.4 mm. |
| 9 | α,α-dimethoxy toluene | 2-phenyl-4,7-dihydro | 55 | 79° C.—0.6 mm. |

It is thus apparent that a wide variety of substituted dioxepins may be prepared in good yield and purity by the single exchange reaction of 2-butene-1,4-diol with an acetal or a ketal.

What is claimed is:

1. A method for preparing a substituted 1,3-dioxepin having the formula

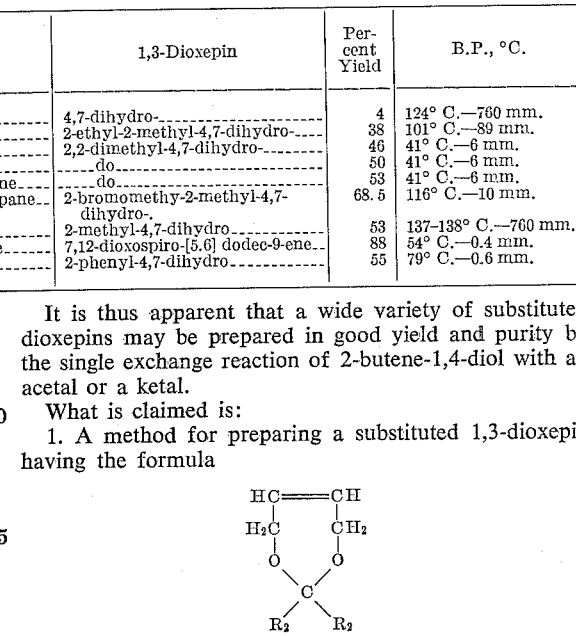

where R and R$_2$ have the meaning given below, which method comprises reacting 2-butene-1,4-diol with a dialkoxy compound selected from the group consisting of acetals and ketals having the formula:

wherein R is a member of the group consisting of hydrogen, the phenyl radical, and alkyl and haloalkyl radicals having up to 9 carbon atoms, R$_2$ is an alkyl radical having up to 9 carbon atoms, and R and R$_2$ together represent the bivalent radical.

and R$_1$ and R$_3$ each represent an alkyl group having up to 9 carbon atoms, in the presence of a non-oxidizing acid catalyst.

2. Method of claim 1, wherein a stoichiometric excess of the dialkoxy compound is employed.

3. Method of claim 1, wherein the reaction is carried out at between 20° C. and 100° C.

4. Method of claim 1, wherein the dialkoxy compound is 2,2-dimethoxypropane.

5. Method of claim 1, wherein the dialkoxy compound is 2,2-dimethoxy-3-bromo propane.

6. A method for preparing 2,2-dimethyl-4,7-dihydro-1,3-dioxepin which comprises reacting 2-butene-1,4-diol with 1,1-diethoxyethane in the presence of a non-oxidizing acid catalyst.

References Cited in the file of this patent

UNITED STATES PATENTS

| | | |
|---|---|---|
| 2,071,252 | Carothers | Feb. 16, 1937 |
| 2,110,499 | Carothers | May 8, 1938 |
| 2,341,306 | Agre et al. | Feb. 8, 1944 |